United States Patent [19]

Crombie

[11] 4,380,166
[45] Apr. 19, 1983

[54] TESTING APPARATUS FOR A DUAL PRESSURE INDICATOR AND CONTROL UNIT FOR PASTEURIZATION EQUIPMENT

[76] Inventor: Robert A. Crombie, 521 Cowles Ave., Joliet, Ill. 60435

[21] Appl. No.: 355,188

[22] Filed: Mar. 5, 1982

Related U.S. Application Data

[63] Continuation-in-part of Ser. No. 237,687, Feb. 23, 1981, abandoned.

[51] Int. Cl.³ .................................... G01N 27/00
[52] U.S. Cl. .............................. 73/4 R; 73/168
[58] Field of Search ................. 73/4 R, 4 D, 168

[56] References Cited

U.S. PATENT DOCUMENTS

| | | | |
|---|---|---|---|
| 3,089,331 | 5/1963 | Sharko et al. | 73/4 R |
| 4,114,426 | 9/1978 | McLean | 73/168 |
| 4,181,016 | 1/1980 | Shapink | 73/168 |

*Primary Examiner*—S. Clement Swisher
*Attorney, Agent, or Firm*—McCaleb, Lucas & Brugman

[57] ABSTRACT

The testing apparatus comprises two pressure regulators, two pressure gauges or an optional dual pressure gauge, and valve mechanism. In one embodiment the valve mechanism comprises two valves, namely a power actuated three-way air valve and a power actuated four-way air valve controlled by a mode selector. In an alternative embodiment, the valve mechanism comprises a single three-way air valve controlled by a mode selector. The valves are illustrated in the drawings as solenoid operated valves controlled by electrical selector switches. The testing apparatus has an input line or conduit connectable to two pressure ports of a dual pressure indicator and control unit for pasteurizing equipment. In either embodiment illustrated, actuation of the mode selector places the testing apparatus selectively in tracking or differential test modes. In the tracking mode, both output lines are connected to the input line through a single one of the pressure regulators to thereby apply to the output lines identical pressures determined by a single pressure regulator. In the differential mode, the output lines are connected to the input line through respective ones of the two pressure regulators to thereby apply to the output lines pressures determined by the individual pressure regulators. The entire testing apparatus is self-contained in a portable case.

10 Claims, 9 Drawing Figures

TESTING APPARATUS FOR A DUAL PRESSURE INDICATOR AND CONTROL UNIT FOR PASTEURIZATION EQUIPMENT

This application is a continuation in part of Ser. No. 237,687 filed Feb. 23, 1981 now abandoned.

BACKGROUND OF THE INVENTION

In the continuous flow method of pasteurizing milk, etc., it is subjected to a high temperature, usually above 161 degrees F., in order to destroy certain microorganisms and prevent or arrest fermentation. For efficient utilization of the heat energy required, the heated, pasteurized product and the relatively cold, raw product are passed through a heat exchanger. This is sometimes called a regenerator. This cools the pasteurized product while preheating the raw product by heat transfer across stainless steel plates.

It is absolutely essential, and the public health laws and regulations reflect this, that the pasteurized product in the heat exchanger be at a higher pressure, typically about four psi, than raw product, to prevent contamination. For this purpose, a differential pressure indicator and control unit is required for each milk pasteurizer to show the pressures of the respective pasteurized and raw products in the heat exchanger. Further, the unit is commonly provided with a differential pressure switch which de-energizes the pump or pumps of the pasteurization system and renders it inoperable if the required pressure differential is not maintained.

One of the important responsibilities of the milk plant inspector is to check the differential pressure indicator and control unit and verify that it provides accurate pressure readings and will in fact automatically close down the system if the minimum pressure differential is not maintained across the plates of the heat exchanger.

There is a need for a simple and dependable apparatus to test dual pressure indicator and control units of this kind.

OBJECT OF THE INVENTION

The principal object of the present invention is to provide portable testing apparatus for a dual pressure indicator and control unit for the kind used to monitor and control pasteurizing equipment.

Another object is to provide such testing apparatus having valve means, an input line connectable to a fluid pressure source, two output lines connectable respectively to the two pressure ports of a pasteurizing system dual-pressure indicator and control unit, two pressure regulators with pressure gauges associated with each, and means for selectively placing the valve means either in a tracking test mode or a differential test mode whereby in the tracking test mode both output lines are connected to the input line through a single one of the pressure regulators, and whereby further in the differential test mode the output lines are connected to the input line through respective ones of the two pressure regulators.

Another object is to provide such testing apparatus in which the valve means comprises two valves whose operations are so inter-related that: in both the tracking and differential test modes, one output line is connected to the input line through one pressure regulator and one valve; in the tracking test mode, the other output line is connected to the input line through said one pressure regulator and both valves; and, in the differential test mode, the other output line is connected to the input line through the other pressure regulator and both valves.

Another object is to provide such testing apparatus in which the valves are solenoid-actuated to selectively place the apparatus either in the tracking or differential test mode.

Another object is to provide such testing apparatus in which large accumulator chambers are associated with the output lines or conduits to even out pressure variations transmitted through them.

Other objects and advantages will be apparent from the following detailed description and annexed drawings.

BRIEF DESCRIPTION OF THE DRAWINGS

Like parts are referred to by like reference characters throughout the figures of the drawings.

Figure 1:
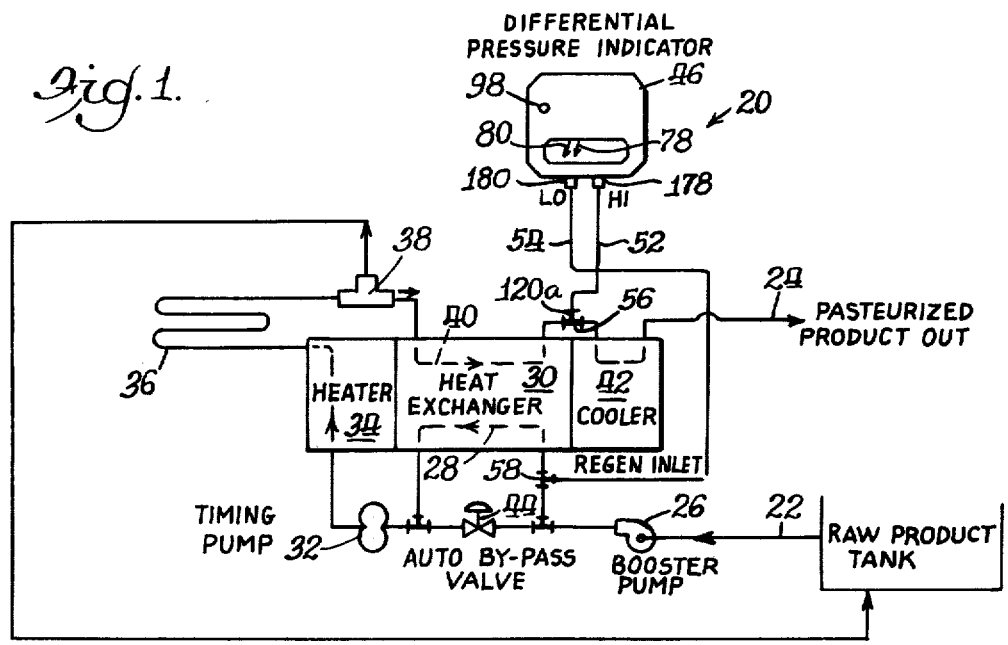
FIG. 1 is a construction diagram and flow sheet of a typical pasteurizing system with which the present invention may be advantageously employed.

Referring now more specifically to the drawings, a typical pasteurizing system 20 is shown in FIG. 1. Raw product such as milk enters at 22 and pasteurized product exits at 24. Processing involves pumping the fluid through a booster pump 26, the cold side 28 of a heat exchanger 30, a timing pump 32, a heating chamber 34, a holding tube 36, a flow diverting valve 38, the hot side 40 of the heat exchanger, and a cooling chamber 42. An automatic by pass valve 44 closes almost completely in response to energization of the booster pump, by control means not shown. The system also has additional control means, not shown, for actuating the flow diverting valve at times to recycle milk to the raw product tank.

The pasteurizing system 20 has a number of conventional automatic safety controls, not shown. One of these makes it impossible for the booster pump 26 and therefore for the system to operate unless:

1. The timing pump 32 is in operation;
2. The flow diversion valve 38 is in the forward flow position and the product is above the legal pasteurization temperature; and
3. When the pasteurized product pressure at tee 56 exceeds the raw product pressure at tee 58 by at least one psi.

As a practical matter, the pressure at 56 should be set at a minimum of four psi above that at 58 to allow for a slight time lag when contacts of the magnetic motor starter (not shown) for the booster pump disengage. This pressure differential is preset in a dual pressure indicator and control unit 46 by eccentric 104 shown in FIG. 6.

Figure 2:
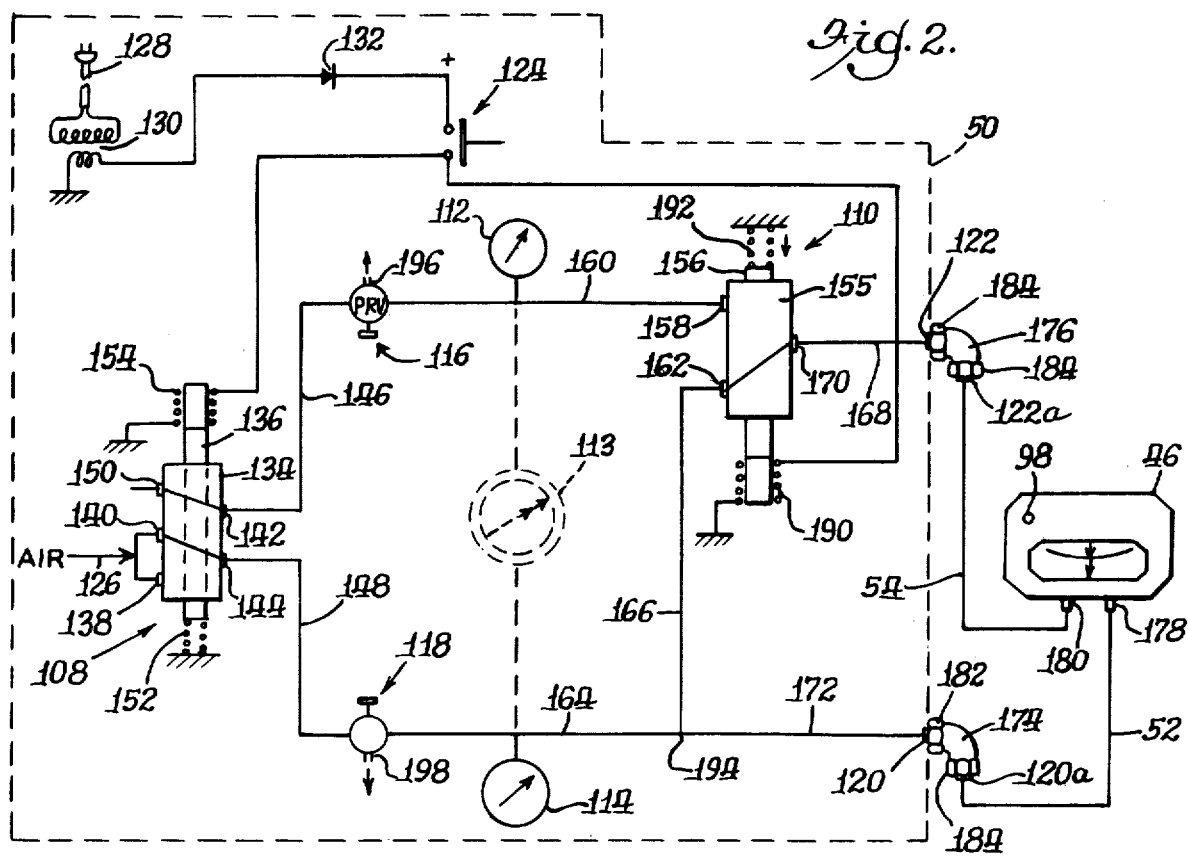
FIG. 2 is a testing apparatus illustrating a preferred from of the present invention, in tracking test mode.
Figure 3:
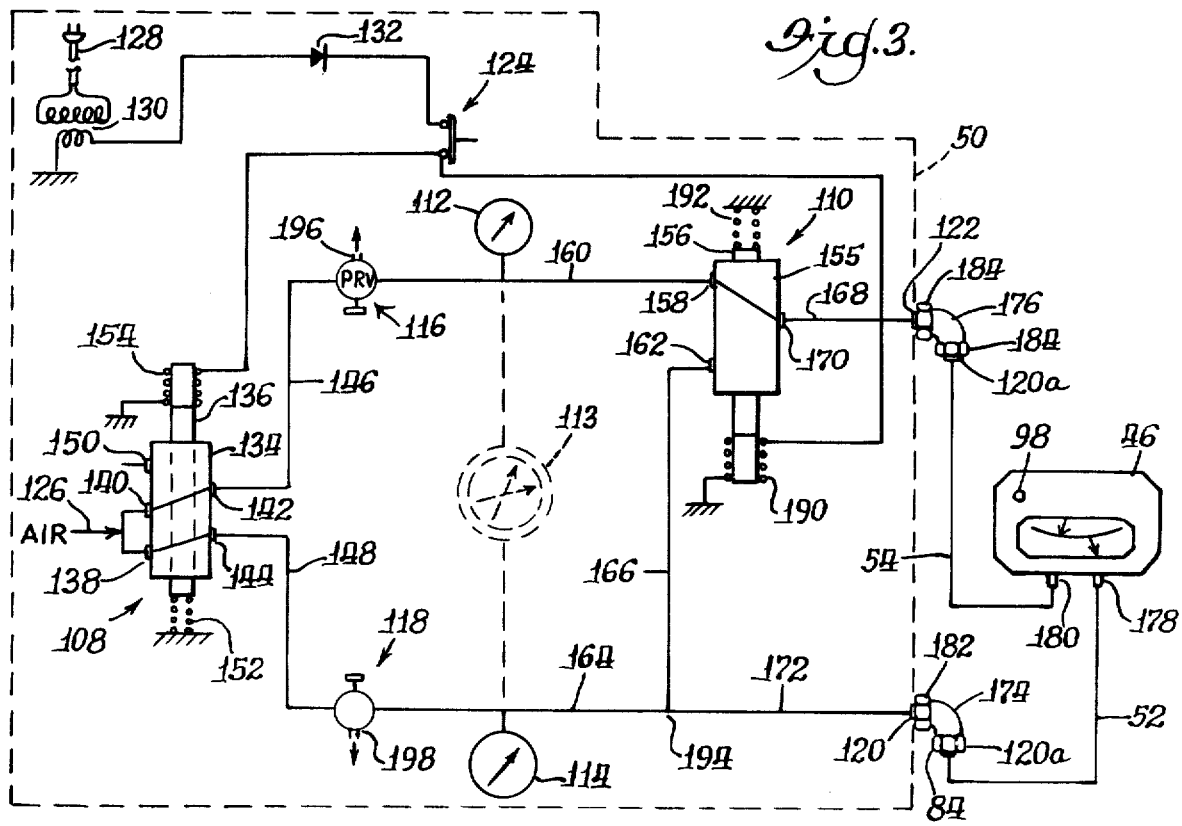
FIG. 3 is the same testing apparatus, in differential test mode.

The testing apparatus of the present invention is generally designated 50, shown in FIGS. 2 and 3. Inasmuch as the purpose of that apparatus is to test the unit 46, a brief description of the internal components of unit 46 and their functions will now be described although the unit 46 is not itself part of the present invention. Briefly, however, the unit 46 and others like it include at least high and low pressure sensors and indicators, and a pressure differential sensor and switch. One example is the Taylor Model 117K Sanitary Pressure Indicator With Differential Pressure Switch, marketed by Taylor Instrument Companies, Rochester, N.Y. The basic components of one such unit are shown in FIG. 6 and will now be described.

Figure 5:
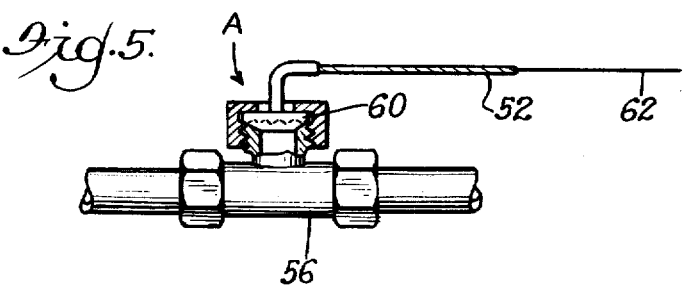
FIG. 5 is a fragmentary enlargement of FIG. 1.

High and low pressure lines 52 and 54 are connected respectively to tees 56 and 58. Referring to FIG. 5, the tee 56 has a conventional diaphram type pressure sensor in the cap 60. Referring to FIGS. 1 and 6, a conventional liquid capillary tube 62 within pressure line 52 transmits the pressure sensed at 56 through the inlet pressure port 178 of the pressure indicator 46. Likewise, a liquid capillary tube 64 within pressure line 54 transmits pressure at 58 through inlet pressure port 180.

Figure 6:
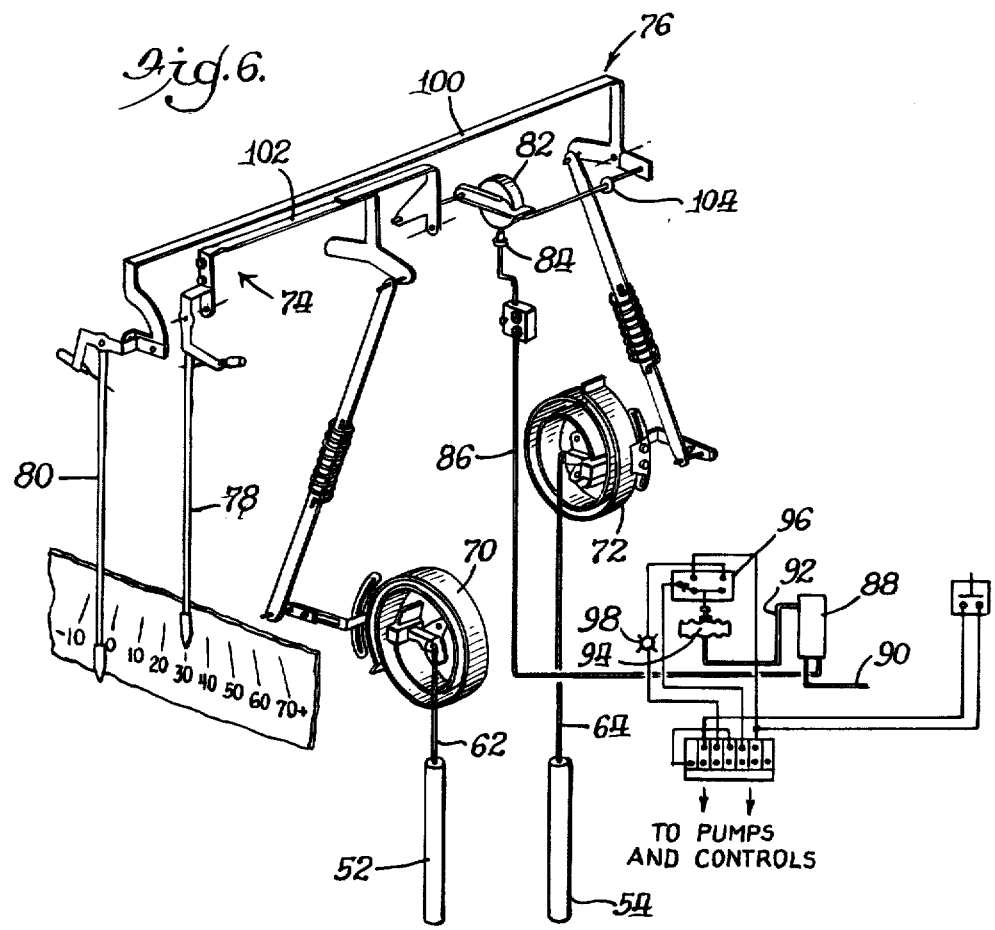
FIG. 6 is a perspective view of the internal working parts of a differential pressure indicator and control unit for the type to be tested by the apparatus of the present invention.

Referring to FIG. 6, pressures in capillary tubes 62 and 64 are transmitted to high and low pressure bourdon tubes 70 and 72 respectively. These are connected by separate pivoted linkages 74 and 76 to pointers 78 and 80 respectively. A baffle 82, providing a connection between both linkages, controls leakage of air through a nozzle 84. The nozzle is connected through a tube 86 to an accumulator or capacity tank 88 which is supplied with air under pressure through a tube 90. Another tube 92 connects the accumulator to an inflatable bellows 94.

A differential pressure switch 96 controls operation of the booster pump 26, by a control circuit not shown. This pressure switch is air-actuated by nozzle detector 84 which senses motion of baffle 82 produced by changes in the pressure differential between tees 56 and 58.

Under normal operating conditions in which the pasteurized product pointer 78 shows a minimum of four psi more than the raw product pointer 80, the baffle 82 rests on the nozzle 84 and blocks exit of air from tube 86. The resulting pressure back-up in accumulator 88 and bellows 94 expands the latter to close pressure switch 96. This starts the booster pump (through a control circuit not shown) and simultaneously turns on test lamp 98 to show that the circuit is in condition to energize the booster pump. The inflated bellows 94 holds the pressure switch in its closed position, allowing the booster pump to run, and to keep the test lamp lighted as long as the pressure differential is above the preset minimum.

Assume a process pressure change occurs, reducing the pressure differential at tees 56 and 58 below the preset minimum. If the reduction in differential is caused by an *increase* in raw product pressure at tee 58, the pointer yoke 100 of linkage 76 rotates *counterclockwise* raising the baffle 82 from the nozzle 84. On the other hand, if the reduction is caused by a *decrease* in pasteurized product pressure at tee 56, pointer yoke 102 of linkage 74 rotates *clockwise*, raising the baffle from the nozzle. This reduces the nozzle backpressure, deflating the pressure switch actuator bellows, opening the switch, and shutting off the booster pump.

Equal changes in the same direction of both raw and pasteurized product pressures do not change the nozzle-baffle relationship and therefore have no effect on booster pump operation.

The minimum differential pressure required to maintain pump operation is preset by adjustment of an eccentric member 104. The differential is adjusted to insure operation of the booster pump as required by public health laws and regulations under all operating conditions.

The testing apparatus of the present invention comprises an arrangement of control valves optionally selectable to apply the same or different pressures to the high and low pressure bourdon elements 70 and 72 in the dual pressure indicator and control unit 46.

Figure 7:
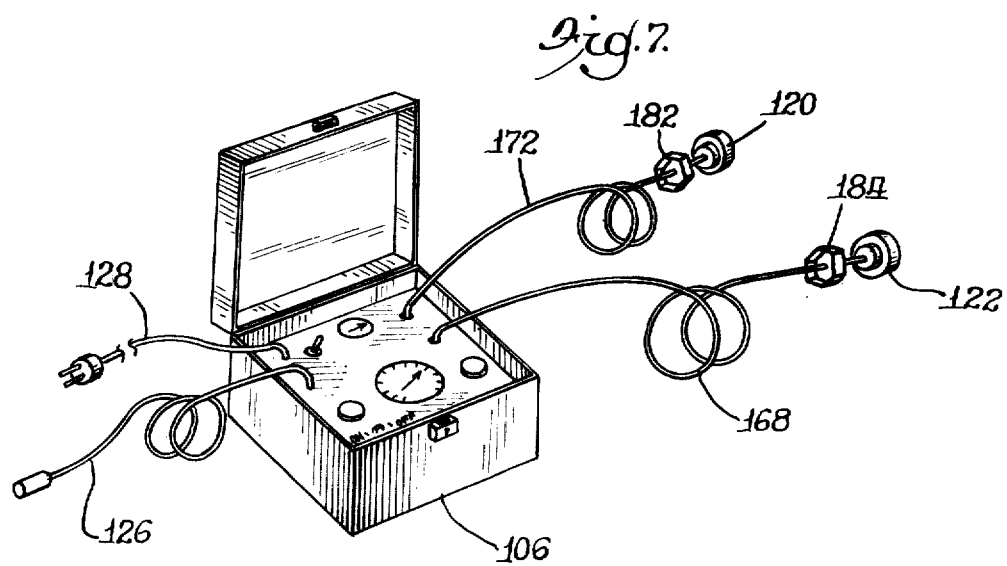
FIG. 7 is a perspective view showing the components of FIGS. 2 and 3 in a compact, portable case.

Specifically, the testing apparatus 50 illustrated comprises the components shown within the broken lines in FIGS. 2 and 3. These components may be installed in a readily portable compact case 106 (FIG. 7) for movement from one pasteurizing installation to another. The apparatus 50, as illustrated in the drawings, comprises: a power actuated four-way air valve, namely a solenoid-actuated four-way, five-port valve 108; a power actuated three-way air valves, namely a solenoid-actuated three-way, three-port valve 110; a pair of precision pressure gauges 112 and 114; a pair of manually adjustable pressure regulators 116 and 118; a pair of special pressure hose end cap fittings 120 and 122; a mode selector, namely a mode selector switch 124; an air input line 126; an electrical input cord 128; a step-down transformer 130; a rectifier illustrated by the diode 132, and suitable electrical conductors and air conduit interconnections for these components. As an alternative to the two precision test gauges 112 and 114, a single precision dual pressure gauge 113 may be used; this is shown in broken lines in FIGS. 2 and 3.

Four-way valve 108 comprises a ported casing 134 and a reciprocable plunger 136. The casing has inlet ports 138 and 140 connected to the air input line 126 which, in turn, is connected to an air pressure source (not shown). Outlet ports 142 and 144 are connected by lines 146 and 148 to pressure regulators 116 and 118 respectively. Port 150 connects to atmosphere. The plunger 136 is moved downward against a spring 152 by a solenoid 154 when the latter is energized by closing switch 124.

The plunger 136 is urged upwardly by the spring 152 to the position of FIG. 2 when switch 124 is open and solenoid 154 thereby deenergized. When the switch is closed to energize the solenoid, it holds the plunger downward in the position of FIG. 3.

Thus the switch 124 determines two modes for the four-valve 108 as follows:

When the switch is opened, the valve directs air under pressure to pressure regulator 118 alone; and when the switch is closed, the valve directs air to both pressure regulators 116 and 118.

Three-way valve 110 comprises a ported casing 155 and a reciprocable plunger 156 which is moved upward against a spring 192 by a solenoid 190 when the latter is energized by closing switch 124. The casing has an inlet port 158 connected to pressure regulator 116 through line or conduit 160, and another inlet port 162 connected to pressure regulator 118 through lines or conduits 164 and 166. A flexible hose or pressure tube 168, having the end cap fitting 122, is connected to an outlet port 170. A second flexible hose or pressure tube 172, having the end cap fitting 120, is connected at point 194 to lines or conduits 164 and 166 through line or conduit 172.

Figure 4:
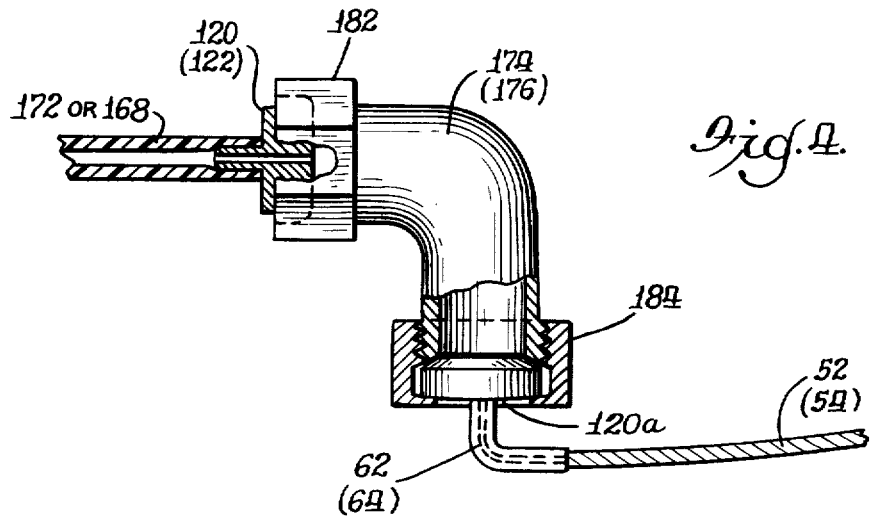
FIG. 4 is a fragmentary enlargement of FIG. 2 or 3, illustrating use of standard stainless steel ells to provide a working connection between the testing apparatus of FIGS. 2 and 3, and the differential pressure unit from FIG. 1 which would be tested by it.

As shown in FIGS. 2, 3 and 4, ordinary two inch stainless steel sanitary ells 174 and 176 are used to provide connections between flexible hose 172 and 168 and pressure lines 52 and 54, the latter being connected to the inlet pressure ports 178 and 180 of the unit 46.

FIG. 4 shows the ell 174 somewhat enlarged for detail, it being understood that ell 176 would be similar. Coupling rings 182 and 184 hold special pressure hose end cap fittings 120 and 120a at opposite ends of the ell. Similarly end cap fittings 122 and 122a are coupled to the ends of ell 176. Flexible hose 172 connects to ell 174 through a nippled opening in end cap 120 and flexible hose 168 connects to ell 176 through a similar nippled opening in end cap 122. At the opposite ends of the ells, the caps 120 and 120a contain a diaphram type pressure sensor for transmitting pressure through liquid capillary tubes 62 and 64 to the bourdon elements 70 and 72 (FIG. 6). The ells 174 and 176 function as accumulators tending to level out sudden variations in pressure received through lines 172 and 168.

Three-way valve 110 has a solenoid 190 and spring 192 similar to those elements in the four-way valve 108. The plunger 156 is urged downwardly by spring 192 to the position of FIG. 2 when switch 124 is open and solenoid 190 is thereby deenergized. When the switch is closed to energize the solenoid, it holds the plunger upwardly in the position of FIG. 3.

Thus, while the switch 124 determines two modes for the four-way valve 108 as described, it at the same time determines two modes for the three-way valve 110 as follows:

When the switch is opened, the same pressure is directed from pressure regulator 118 to both inlet ports 178 and 180 of the dual pressure indicator and control unit 46; and when the switch is closed, different pressures may be directed from the separate pressure regulators 112 and 114 to the inlet ports 178 and 180.

Use and operation of the test apparatus 50 is believed apparent from the above description. Briefly, however, the apparatus will be carried in its case 106 to the pasteurizing equipment to be tested, with the electrical cable 128, and pressure lines 52 and 54 may be coiled up inside.

At the site of the pasteurizing equipment shown in FIG. 1, the equipment will be shut down and the diaphram-containing pressure sensor caps 120a and 122a at the ends of pressure lines 52 and 54 will be disconnected from the tees 56 and 58 respectively. These will then be reconnected to the output ends of ells 174 and 176 as shown in FIGS. 2 and 3. This is also shown enlarged in FIG. 4.

With the testing apparatus 50 connected to the dual pressure indicator and control unit 46 as shown in FIGS. 2 and 3, two general kinds of tests can be run on the unit 46, namely: "tracking" testing; and "differential" testing.

Tracking testing determines if both pointers 78 and 80 read the same (or within an acceptable tolerance) when the same pressure is applied to the capillary tubes 62 and 64 within pressure lines 52 and 54. This is performed with the switch 124 in off position as shown in FIG. 2. The pressure of air entering through input line 126 is regulated in line 164 by manually adjusting the regulator 118. This pressure divides at point 194, passes to the high pressure inlet port 178 via line 172, ell 174, and line 52; and passes to low pressure inlet port 180 via line 166, three-way valve 110, line 168, ell 176, and line 54. By changing the setting of pressure regulator 118, various pressures indicated by precision gauge 114 can be applied to both pressure ports 178 and 180 simultaneously. If the pressures indicated by pointers 78 and 80 are the same as that indicated on test gauge 114, the unit 46 passes the tracking test. It is extremely easy to perform such a tracking test throughout the entire pressure range of the unit 46 simply by applying different pressures through the regulator 118.

Each pressure regulator 116 and 118 has an inbuilt pressure relief line indicated by the reference numerals 196 and 198 respectively. This prevents false readings on either gauge 112 or 114 as a result of air being trapped in the lines in a previous test.

Differential testing determines if the pointers 78 and 80 read different pressures according to the preselected pressure differential which is required between the raw and pasteurized products. During differential testing, the pressures indicated by the pointers 78 and 80, and the differential between them, are checked against the precision pressure gauges 112 and 114. This is performed with switch 124 in on position as shown in FIG. 3. The pressure of air entering through input line 126 is regulated in lines 160 and 164 by manually adjusting the respective regulators 116 and 118. These pressures are applied to pressure ports 178 and 180. If their exact values and differentials agree with those on the precision test gauges, the unit 46 passes the differential test. This test will typically be repeated for other pressure ranges by changing the pressure settings of regulators 116 and 118.

Another test which can be performed in the differential mode of FIG. 3 is determining the accuracy of the differential pressure controller switch 96 and to verify that it will in fact shut down the pasteurizer if a predetermined pressure differential is not maintained. Typically, the pressure differential must be at least four psi for the booster pump 26 to run and the test lamp 98 to be lighted. To test this, in the FIG. 3 mode, the two pressure regulators 116 and 118 will be adjusted to provide a sufficient pressure differential that the test lamp 98 will turn off. Then, one or both of the pressure regulators will be adjusted to reduce this pressure differential. If the test lamp comes on when the gauges 112 and 114 show a differential of more than four psi (or other preset value) the controller switch passes this test.

Figure 8:
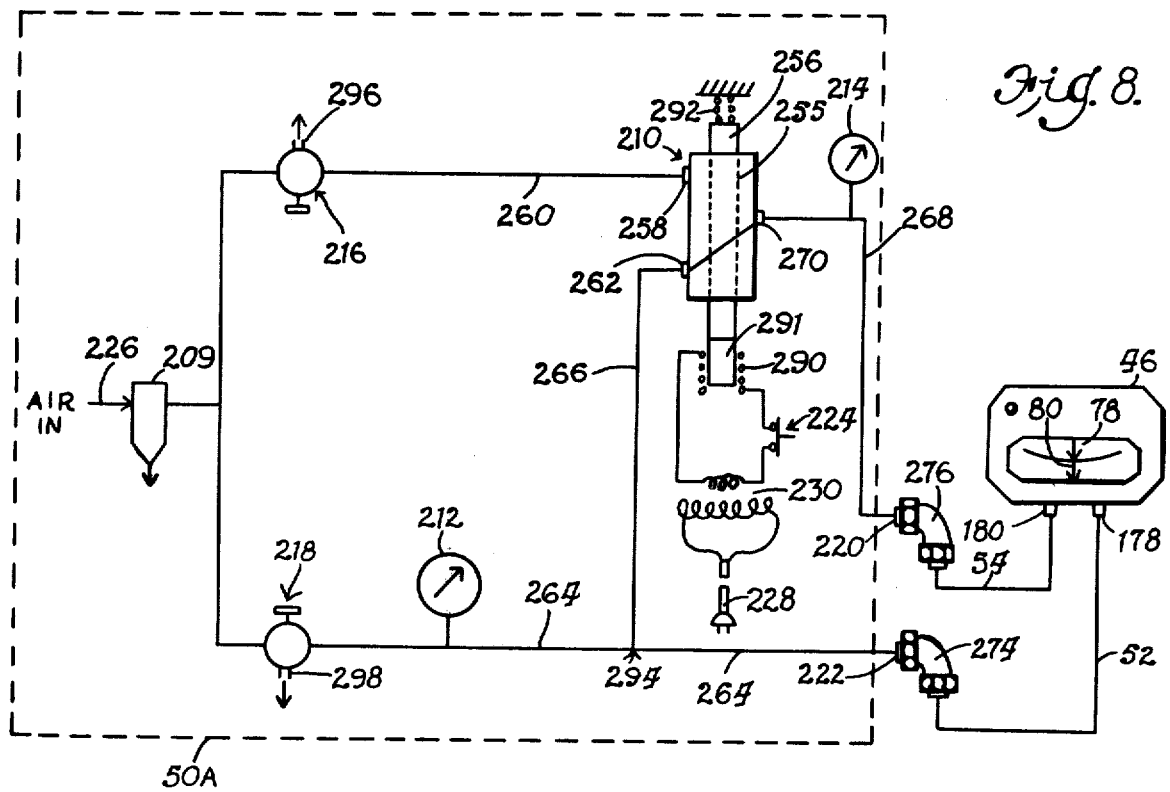
FIG. 8 is an alternative form of testing apparatus in tracking test mode.
Figure 9:
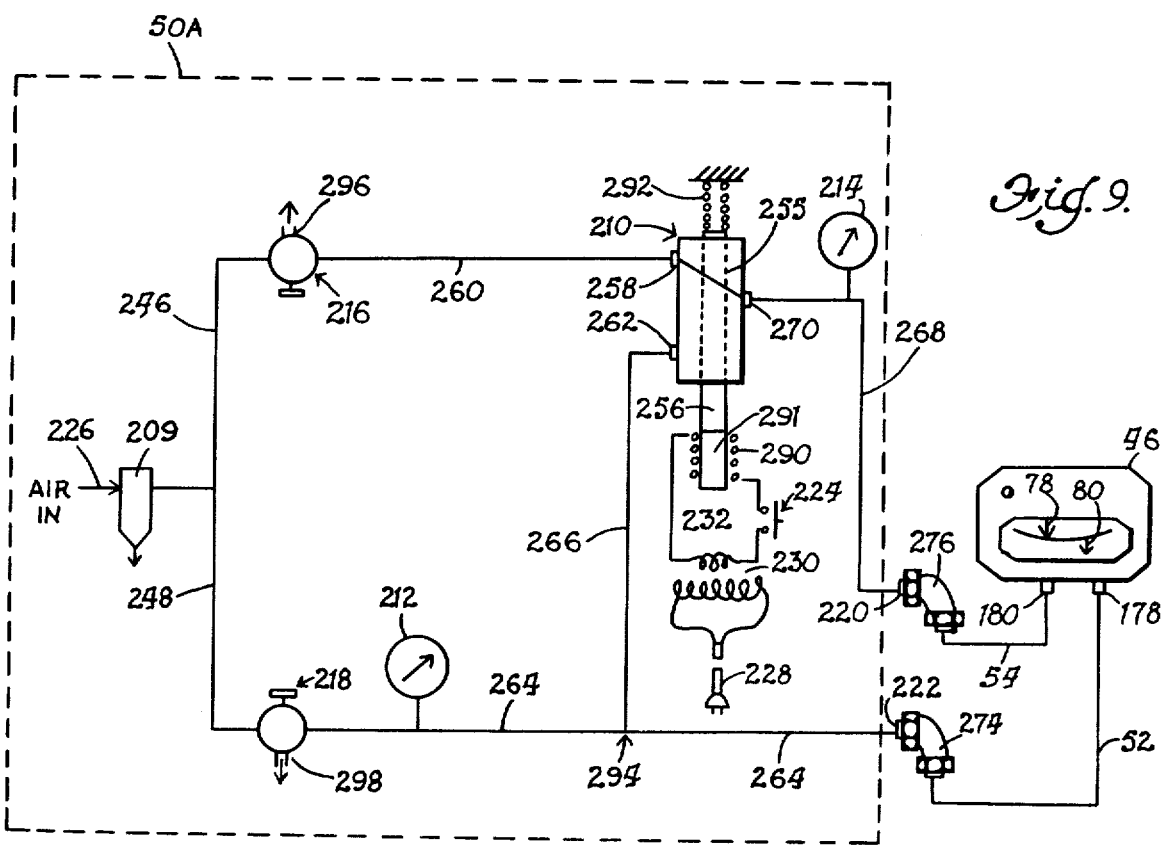
FIG. 9 is the same alternative form of testing apparatus in differential test mode.

Referring now to the alternative testing apparatus 50A illustrated in FIGS. 8 and 9, this comprises a solenoid-actuated three-way, three-port valve 210 having a casing 255 with inlet ports 258 and 262 and outlet port 270; a pair of precision gauges 212 and 214; a pair of manually adjustable pressure regulators 216 and 218; a pair of special pressure hose end cap fittings 220 and 222; a mode selector, namely, a mode selector switch 224; an air input line 226; a filter and moisture trap 209; an electrical input cord 228; a step-down transformer 230; a rectifier illustrated by the diode 232, and suitable electrical conductors and air conduit interconnections for these components. A solenoid 290, when energized by closing the switch 224, as shown in FIG. 8, moves the armature 291 upward to provide an interconnection between inlet port 262 and outlet port 270. When the switch 224 is open as shown in FIG. 9, the spring 292 moves the armature 291 downward to interconnect inlet port 258 with outlet port 270.

The alternative embodiment 50A is placed in the tracking mode shown in FIG. 8 by closing the mode switch 224. The pressure of air entering through input conduit 226 is regulated in conduit 264 by manually adjusting the regulator 218. This pressure from conduit 264 divides at the point 294, passes to pressure port 178 of unit 46 via ell 274 and conduit 52; and passes to pressure port 180 of unit 46 via conduit 266, inlet port 262, valve 210, conduit 268, ell 276 and conduit 54. By changing the setting of pressure regulator 218, various pressures indicated by precision gauge 212 can be applied to both pressure ports 178 and 180 simultaneously. If the pressures indicated by pointers 78 and 80 are the same as that indicated on test gauge 212, the unit 46 passes the tracking test. It is extremely easy to perform such a tracking test throughout the entire pressure range of the unit 46 simply by applying different pressures through the regulator.

As described previously herein for pressure regulators 116 and 118, each regulator 216 and 218 has an inbuilt pressure relief indicated by the reference numerals 296 and 298 respectively. This prevents false readings on either gauge 212 or 214 as a result of air being trapped in the lines in a previous test.

Apparatus 50A is placed in differential testing mode by opening the mode switch 224 as shown in FIG. 9. In this case air enters from the fluid pressure source 226 into the input conduit means consisting of the two individual input conduits 260 and 264. The pressure of air entering through input conduit 260 is determined by manual adjustment of the pressure regulator 216 and this is directed to pressure port 180 of unit 46 via valve 210, conduit 268, ell 276 and conduit 54; pressure in input conduit 264 is determined by manual adjustment of regulator 218 and is directed to pressure port 178 of unit 46 via ell 274 and conduit 52. Pressure in pressure ports 180 and 178 is indicated by gauges 214 and 212 respectively and controlled by pressure regulators 216 and 218 respectively.

While two forms in which the present invention may be embodied have been shown and described, it will be understood that various modifications may be effected without departing from the spirit and scope of the invention as defined by the appended claims. For example, taking advantage of compressed air from the source which supplies air input line 126 or 226, power-actuated valves 108 and 110, and valve 210, may be air-pressure-actuated air valves (not shown) instead of solenoid-actuated as shown. In such case, the mode selector 124 or 224 may be an air selector valve or a manual three-way valve (not shown). The use of electrical- or fluid pressure-actuated valves will be a matter of choice for any particular installation.

The embodiments of the invention in which an exclusive property or privilege is claimed are defined as follows:

1. Testing apparatus for a dual pressure indicator and control unit of the kind used to monitor and control pasteurizing equipment, said unit having two pressure ports with indicating means associated therewith, said unit also having a control switch operable in response to a predetermined pressure differential between said ports, said ports being connected in use to pressure sensors at a pasteurized product outlet and a raw product inlet respectively in such pasteurizing equipment, said testing apparatus comprising:

valve means;
an input line at the input side of said valve means and adapted to be connected to a fluid pressure source;
two output lines at the output side of said valve means and adapted to be connected respectively to the two pressure ports of a pasteurizing system dual pressure indicator and control unit;
two pressure regulators;
a pressure gauge on the output side of each pressure regulator;
means for selectively placing said valve means either in a tracking test mode or a differential test mode;
said valve means in said tracking test mode connecting both of said output lines to said input line through a single one of said pressure regulators to thereby apply identical pressures determined by said one pressure regulator to said output lines; and
said valve means in said differential test mode connecting said output lines to said input line through respective ones of said two pressure regulators to thereby apply pressures determined by said respective pressure regulators to said output lines.

2. Testing apparatus according to claim 1 in which:
the valve means comprises two valves;
said apparatus, in both tracking and differential test modes, connecting one output line to the input line through one pressure regulator and one valve;
said apparatus, in tracking test mode, connecting the other output line to the input line through both valves and said one pressure regulator; and
said apparatus, in differential test mode, connecting the other output line to the input line through both valves and the other pressure regulator.

3. Testing apparatus according to claim 1 in which:
the valve means comprises two valves;
said apparatus, in both tracking and differential test modes, connecting a first one of said output lines to the input line through a first one of said pressure regulators and a first one of said valves;
said apparatus, in tracking test mode, connecting a second one of said output lines to the input line through both valves and said first pressure regulator;
said apparatus, in differential test mode, connecting said second output line to the input line through both valves and a second one of said pressure regulators.

4. Testing apparatus according to claim 1 in which:
said valve means comprises first and second valves;
said first valve having at least one inlet port connected to said input line and having two outlet ports connected respectively to said pressure regulators; said second valve having inlet ports connected respectively to said pressure regulators, and having an outlet port;
said output lines being connected respectively to the outlet port of the second valve and to one of said pressure regulators;
said apparatus, in said tracking test mode, connecting a first one of said output lines directly to a first one of said pressure regulators, and connecting the second of said output lines to said first pressure regulator through said second valve; and
said apparatus, in said differential test mode, connecting said first output line directly to said first pressure regulator, and connecting the second output line to the second pressure regulator through said second valve.

5. Testing apparatus according to claim 1 in which said means for selectively placing said valve means either in a tracking test mode or a differential test mode comprises fluid pressure actuating means or solenoid actuating means for said valve means.

6. Testing apparatus according to claim 1 in which enlarged chambers are provided in said output lines to function as fluid accumulators to level pressure variations transmitted to said output lines.

7. Testing apparatus for a dual pressure indicator and control unit of the kind used to monitor and control pasteurizing equipment, said unit having two pressure ports with indicating means associated therewith, said unit also having control means operable in response to a predetermined pressure differential between said ports, said pressure ports being connected in use to pressure sensors at a pasteurized product outlet and a raw product inlet respectively in such pasteurizing equipment, said testing apparatus comprising:
  valve means;
  input conduit means at the input side of said valve means and adapted to be connected to a fluid pressure source;
  two output conduits adapted to be connected respectively to the two pressure ports of a pasteurizing system dual pressure indicator and control unit;
  a pressure gauge connected to each of said output conduits;
  two manually adjustable pressure regulators connected to said input conduit means;
  means for selectively placing said valve means in a tracking test mode or a differential test mode;
  said valve means in said tracking test mode connecting said input conduit means simultaneously to both of said output conduits via a single one of said pressure regulators to thereby apply identical pressures determined by said one pressure regulators to both of said output conduits; and
  said valve means in said differential test mode connecting said input conduit means simultaneously to both of said output conduits via separate ones of said pressure regulators to thereby apply different pressures determined by the respective pressure regulators to the two output conduits.

8. Testing apparatus for a dual pressure indicator and control unit of the kind used to monitor and control pasteurizing equipment, said unit having two pressure ports with indicating means associated therewith, said unit also having control means operable in response to a predetermined pressure differential between said ports, said pressure ports being connected in use to pressure sensors at a pasteurized product outlet and a raw product inlet respectively in such pasteurizing equipment, said testing apparatus comprising:
  valve means;
  input conduit means at the input side of said valve means and adapted to be connected to a fluid pressure source;
  two output conduits adapted to be connected respectively to the two pressure ports of a pasteurizing system dual pressure indicator and control unit;
  a pressure gauge connected to each of said output conduits;
  two manually adjustable pressure regulators connected to said input conduit means;
  one of said pressure regulators being connected to one of said output conduits;
  means for selectively placing said valve means either in a tracking test mode or in a differential test mode;
  said valve means in said tracking test mode connecting said input conduit means to the other of said output conduits via said one pressure regulator to thereby apply identical pressures determined by said one pressure regulator to both of said output conduits; and
  said valve means in said differential test mode connecting said input conduit means to said other output conduit via the other of said pressure regulators to thereby apply different pressures determined by the respective pressure regulators to the two output conduits.

9. Testing apparatus according to claim 8 in which:
  said input conduit means comprises two input conduits connected respectively to separate inlet ports on said valve means, and said other output conduit is connected to an outlet port on said valve means; and
  the pressure regulators are positioned respectively in said two input conduits.

10. Testing apparatus according to claim 9 in which said valve means is a three-way valve actuatable selectively to connect either of said inlet ports to said outlet port.

* * * * *